(12) United States Patent
Tompson

(10) Patent No.: US 6,595,321 B1
(45) Date of Patent: Jul. 22, 2003

(54) FLOOR MATS HAVING PERIPHERAL APERTURES WITH ACOUSTIC ABSORBING MATERIAL

(75) Inventor: Graham Tompson, Northville, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/109,501

(22) Filed: Mar. 28, 2002

(51) Int. Cl.$^7$ .............................. E04B 2/02; E04B 1/82; E04B 1/84
(52) U.S. Cl. ................. 181/290; 181/286; 181/288; 181/292; 181/293; 181/294
(58) Field of Search ................. 181/284, 288, 181/290–294; 296/39.3, 211

(56) References Cited

U.S. PATENT DOCUMENTS

| | | | |
|---|---|---|---|
| 1,935,302 A | 11/1933 | Waite | 2/278 |
| 2,116,771 A | 5/1938 | Seaman | 181/286 |
| 2,296,502 A | 9/1942 | Cotterman | 156/222 |
| 2,939,179 A | 6/1960 | Penman et al. | 264/243 |
| 3,014,829 A | 12/1961 | Curtin | 154/49 |
| D194,347 S | 1/1963 | Gerber | D9/6 |
| D200,295 S | 2/1965 | Lea | D9/6 |
| 3,703,424 A | 11/1972 | Charnock et al. | 156/272 |
| 3,804,699 A | 4/1974 | Johnson | 161/39 |
| 3,821,065 A | 6/1974 | Copeland et al. | 161/67 |
| 3,953,631 A | 4/1976 | Gordon | 264/243 |
| 4,016,318 A | 4/1977 | DiGioia et al. | 428/95 |
| 4,143,194 A | 3/1979 | Wihksne | 428/81 |
| 4,174,991 A | 11/1979 | Reuben | 156/242 |
| 4,230,755 A | 10/1980 | Morris | 423/95 |
| 4,361,614 A | 11/1982 | Moffitt, Jr. | 428/138 |
| 4,382,986 A | 5/1983 | Reuben | 428/88 |
| 4,399,176 A | 8/1983 | Bell et al. | 428/85 |

(List continued on next page.)

FOREIGN PATENT DOCUMENTS

| | | | |
|---|---|---|---|
| DE | 2619361 | 4/1976 | A47G/27/04 |
| EP | 0259795 A2 | 9/1987 | B60N/3/04 |
| EP | 0351041 A2 | 1/1990 | A47G/27/02 |
| GB | 1325203 | 8/1973 | A47G/27/00 |
| GB | 2171901 | 9/1986 | A47G/27/02 |
| WO | WO 86/06691 | 11/1986 | B60N/3/04 |
| WO | WO 94/20292 | 9/1994 | B32B/3/28 |

OTHER PUBLICATIONS

J.C. Whitney Catalog No. 515J, p. 96, MAT No. 1 of 4 piece Carpet mat Set, Bottom Center of Page.

J.C. Whitney Catalog No. 515T, p. 97, Plush Carpet Mat No. 1, Lower Left Center of Page and Customer–tailored Carpet Mat No. 3, Left Center of Page.

English Translation of *Manufacturing Method of Rug Mats*, Japanese Patent Application No. 59–14813, dated Jan. 25, 1984.

English Translation of aA *Manufacturing Method of Carpet Mats*, Japanese Patent Application No. 59–14813, dated Jan. 25, 1984.

English Translation of *Presentation of Publications and Others*, Japanese Patent Application No. 4–1–12,833, date Apr. 12, 1999.

English Translation of *Mat and Method for Manufacturing Same*, Japanese Patent Application No. 1–223,909.

Primary Examiner—Robert E. Nappi
Assistant Examiner—Patrick Miller
(74) Attorney, Agent, or Firm—Myers Bigel Sibley & Sajovec

(57) ABSTRACT

A multi-layer acoustically absorptive mat includes a base layer having a peripheral portion with a plurality of apertures formed in the peripheral portion in adjacent, spaced-apart relationship. A face layer disposed adjacent the base layer. An acoustic absorbing layer is interposed between the peripheral portion of the base layer and the face layer. The acoustic absorbing layer includes a respective exposed portion that extends across each of the apertures.

36 Claims, 3 Drawing Sheets

U.S. PATENT DOCUMENTS

| | | | |
|---|---|---|---|
| 4,465,720 A | 8/1984 | Bell et al. | 428/85 |
| 4,479,992 A | 10/1984 | Häseker et al. | 428/116 |
| 4,529,639 A | 7/1985 | Peoples, Jr. et al. | 428/95 |
| 4,557,970 A | 12/1985 | Holtrop et al. | 428/95 |
| 4,563,378 A | 1/1986 | Roth | 428/86 |
| 4,579,764 A | 4/1986 | Peoples, Jr. et al. | 428/95 |
| 4,609,580 A | 9/1986 | Rockett et al. | 428/297 |
| 4,673,603 A | 6/1987 | Roth | 428/85 |
| 4,721,641 A | 1/1988 | Bailey | 428/88 |
| 4,733,997 A | 3/1988 | Ford et al. | 264/138 |
| 4,748,063 A | 5/1988 | Reuben | 428/78 |
| 4,749,602 A | 6/1988 | Russell | 428/99 |
| 4,751,764 A | 6/1988 | Reuben | 16/8 |
| 4,758,457 A | 7/1988 | Altus | 428/82 |
| 4,828,898 A | 5/1989 | Bailey | 428/88 |
| 4,835,030 A | 5/1989 | Squier et al. | 428/88 |
| 4,938,677 A | 7/1990 | Robbins, III | 264/151 |
| 4,973,505 A | 11/1990 | Bielous | 428/44 |
| D313,789 S | 1/1991 | Thundercloud | D12/203 |
| 5,019,197 A | 5/1991 | Henderson | 156/212 |
| 5,071,614 A | 12/1991 | Grace | 264/243 |
| 5,128,189 A | 7/1992 | Bartlett | 428/71 |
| 5,154,961 A | 10/1992 | Reuben | 428/82 |
| 5,171,619 A | 12/1992 | Reuben | 156/72 |
| 5,298,694 A * | 3/1994 | Thompson et al. | 181/286 |
| D348,646 S | 7/1994 | Reuben | D12/203 |
| 5,362,544 A | 11/1994 | Reuben | 428/82 |
| 5,410,111 A | 4/1995 | Stief et al. | 181/286 |
| 5,620,546 A | 4/1997 | Reuben | 156/219 |
| 5,681,072 A | 10/1997 | Stricker | 296/39.3 |
| 5,876,826 A | 3/1999 | Hoffmann et al. | 428/95 |
| 6,035,965 A * | 3/2000 | Fujiwara et al. | 181/293 |
| RE36,677 E | 5/2000 | Reuben | 156/219 |
| 6,237,717 B1 * | 5/2001 | Osanai et al. | 181/294 |
| 6,382,350 B1 * | 5/2002 | Jezewski et al. | 181/290 |
| 2002/0099891 A1 * | 7/2002 | Cole et al. | 710/200 |

\* cited by examiner

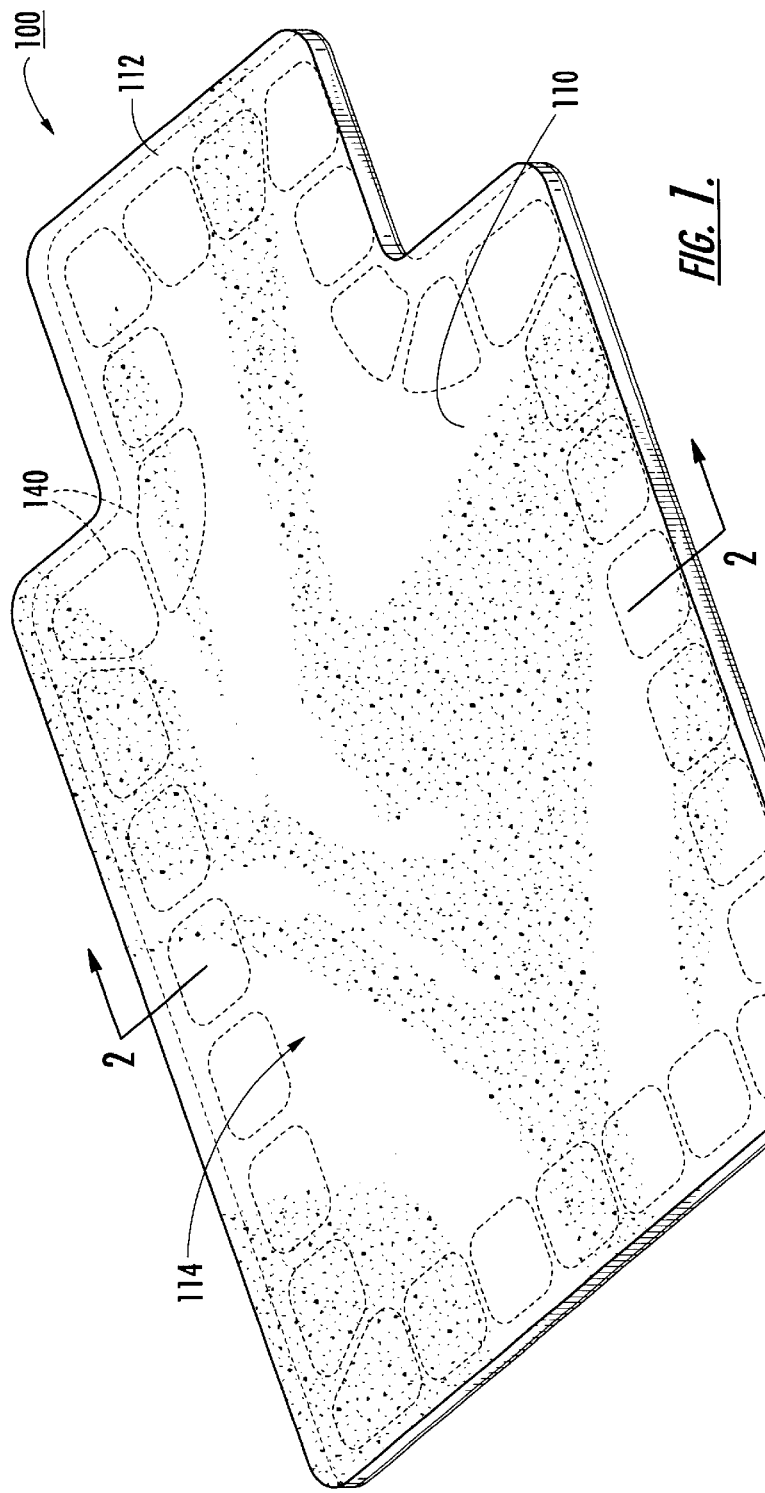
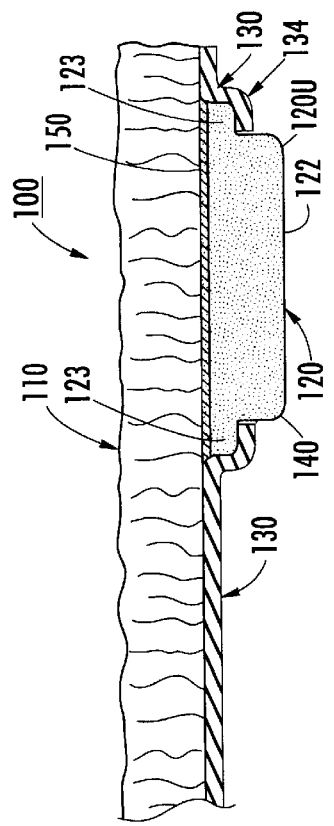
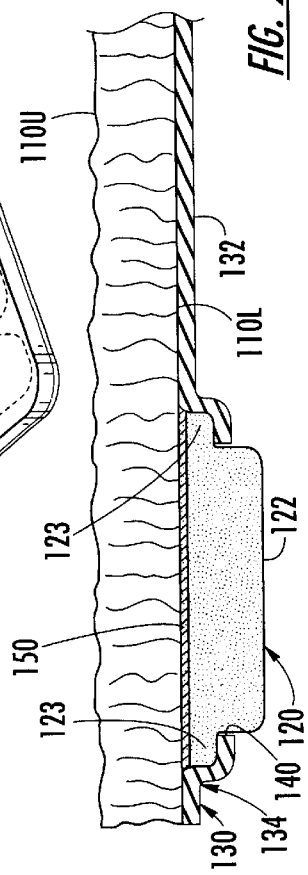
FIG. 1.
FIG. 2.

FLOOR MATS HAVING PERIPHERAL APERTURES WITH ACOUSTIC ABSORBING MATERIAL

FIELD OF THE INVENTION

The present invention relates to mats such as automotive accessory floor mats and, more particularly, to molded mats.

BACKGROUND OF THE INVENTION

It is often desirable to minimize environmental noise. For example, it may be desirable to reduce noise levels in the interior of an automobile in order to improve the comfort of occupants. Sources of such noise may include or be affected by road surface, tire construction, drivetrain noise, exhaust noise, chassis and suspension noise, wind noise and the like. Automobile manufacturers have expended substantial effort and expense to reduce cabin noise.

SUMMARY OF THE INVENTION

According to embodiments of the present invention, a multi-layer acoustically absorptive mat includes a base layer, a face layer, and an acoustic absorbing layer. The base layer includes a central portion and a peripheral portion around the central portion. A plurality of apertures are formed in the peripheral portion in adjacent, spaced-apart relationship. The face layer is disposed adjacent the base layer, and the acoustic absorbing layer is interposed between the peripheral portion of the base layer and the face layer. The acoustic absorbing layer includes a respective exposed portion extending across each of the apertures. The central portion of the base layer is directly bonded to the face layer and the absorbing layer is adhesively secured to the face layer. The exposed portions of the acoustic absorbing layer may extend outwardly from the respective apertures beyond the base layer.

Objects of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a top perspective view of an acoustic absorbing mat according to embodiments of the present invention.

FIG. 2 is a cross-sectional view of the mat of FIG. 1 taken along the line 2—2 of FIG. 1.

DETAILED DESCRIPTION OF EMBODIMENTS OF THE INVENTION

Figure 3:
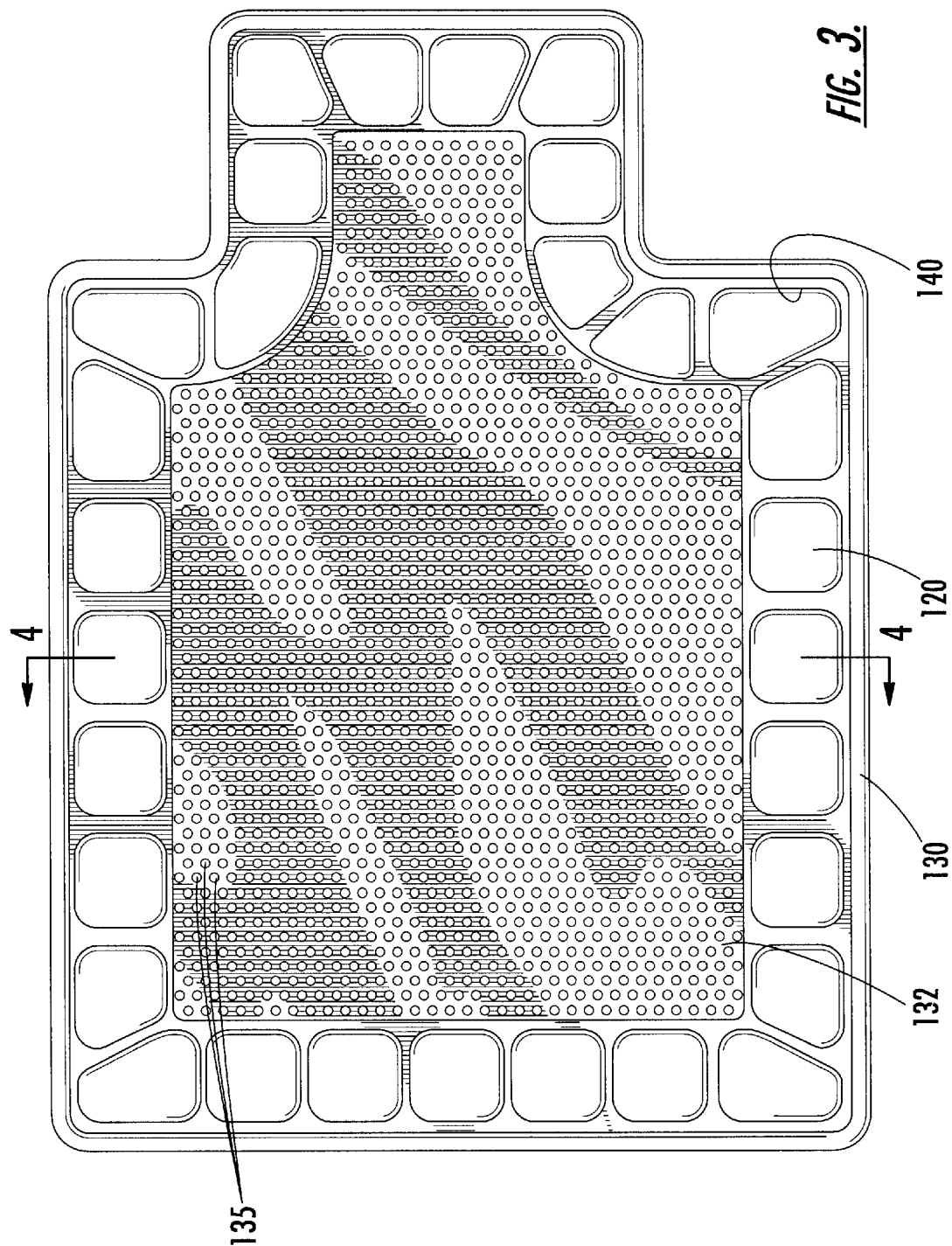
FIG. 3 is a bottom perspective view of an acoustic absorbing mat according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, layers, components or regions may be exaggerated for clarity.

As discussed below, while various surfaces and orientations are identified herein as "upper" and "lower" for convenience and clarity, a mat according to embodiments of the present invention is not limited in applicability to the orientation shown and such surfaces and orientations may properly be referred to as "inner" and "outer", for example.

With reference to FIGS. 1–2, a multi-layer acoustically absorptive mat according to embodiments of the present invention is shown and generally designated by the number 100. The mat 100 may be, for example, an automobile interior floor or cargo mat. The mat 100 may be pliable. As used herein, the term "pliable" means that the mat may be easily folded or flexed. For example, a pliable floor mat can be rolled up and, when held at arm's length, is unable to support its own weight. Alternatively, the mat 100 may be rigid and may retain a three-dimensional shape. The mat 100 includes a base layer 130, a face layer 110, and an acoustic absorbing layer 120. The base layer 130 includes a central portion 132 and a peripheral portion 134 that extends around the central portion 132. A plurality of apertures 140 are formed in the peripheral portion 134 in adjacent, spaced-apart relationship. The face layer 110 is disposed adjacent the base layer 130, and the acoustic absorbing layer 120 is interposed between the peripheral portion 134 of the base layer 130 and the face layer 110. The acoustic absorbing layer 120 includes exposed portions 122 that extend across each of the respective apertures 140.

Figure 4:
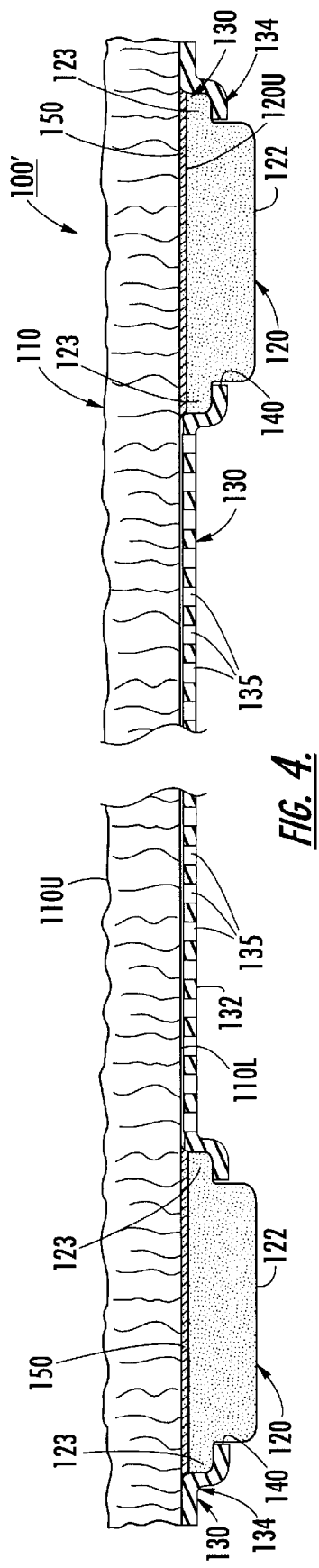
FIG. 4 is a cross-sectional view of the mat of FIG. 3 taken along the line 4—4 of FIG. 3.

A central portion 114 of the mat 100 may be configured to be water impermeable. For example, the base layer 130 may be formed of a material that is water-resistant. Alternatively, a water-resistant layer may be interposed between the base layer 130 and the face layer 110, as would be understood by those skilled in the art. According to an embodiment of the present invention illustrated in FIGS. 3–4, the central portion 132 of the base layer 130 of mat 100' may include a plurality of apertures 135 that are configured to attenuate sound incident on the central portion 132 of the base layer 130. A gap between the central portion 132 of the base layer 130 and the lower surface 110L of the face layer 110 may be provided, although not required.

Referring back to the embodiment of FIGS. 1–2, portions 122 of the acoustic absorbing layer 120 extend downwardly through the apertures 140. However, the layers 120 and 130 may be formed such that the portions 122 do not extend beyond the apertures 140. The acoustic absorbing layer portions 122 may be non-compressed or less compressed than the portions 123 captured between the base layer 130 and the face layer 110. In the illustrated embodiment, a layer of adhesive 150 (e.g., a hot melt or pressure-sensitive adhesive) adheres an upper surface 120U of the layer 120 to a lower surface 110L of the face layer 110. Suitable adhesives include, for example, Dow Intergral 899 or 917 hot melt adhesive available from Dow Chemical of Midland, Mich., or Spunfab VI1010 hot melt adhesive available from Spunfab Adhesive Fabrics of Ohio.

The central portion 132 and peripheral portion 134 of the base layer 130 may be bonded directly to the lower surface 110L of the face layer 110 as illustrated. The face layer 110 and the base layer 130 may optionally include a channeled edge section as described in U.S. Pat. No. 5,620,546 to Reuben, the disclosure of which is incorporated herein by reference in its entirety.

The face layer 110 may be formed from carpet material which is wear-resistant and has a pleasing appearance. Alternatively, the face layer 110 may be an elastomer layer, a thermoplastic layer, such as a vinyl compound, or a non-woven layer. The carpet material may be tufted, woven, needle punched or the like, and may be backed or unbacked. The carpet material may be a looped pile carpet or a tufted pile carpet construction, i.e., a plurality of pile yarns extend through a primary backing to form loops which are, in the case of a tufted pile carpet, cut to form tufts. The fibers of the pile yarns can be composed of natural or synthetic fibers and may be thermoplastic or thermosetting. Suitable carpet fibers are described in U.S. Pat. No. 4,174,991 to Reuben, the disclosure of which is incorporated herein by reference in its entirety, and include polyamide fibers such as nylon fibers, particularly nylon 1 and nylon 11, polyester fibers, acrylic fibers, polypropylene and blends and copolymers thereof. Additionally, the face layer 110 may include multiple sheets of carpet, for example, a multiple sheet, embroidered, pre-punched carpet. Alternatively, the face layer 110 may be formed of woven or knit fabric, non-woven carpet, or any other suitable material.

The base layer 130 may be formed of a heat curable elastomeric material or a thermoplastic material. Exemplary heat curable elastomeric materials include vulcanizable elastomers which are cured by a sulfur reaction mechanism or a metallic oxide mechanism. Particularly suitable elastomeric materials are rubbers such as natural rubber, butadiene polymers and copolymers such as styrene-butadiene rubbers and polybutadiene rubbers, isoprene polymers and copolymers, chloroprene rubbers such as neoprene, nitrile rubbers, butyl rubbers, and ethylene-propylene rubbers, and blends and copolymers thereof. Styrene-butadiene rubbers are particularly preferred for use in the present invention. Suitable thermoplastic materials include polyvinyl chloride, polyethylene, ethylene vinyl acetate, polypropylene, polystyrene, thermoplastic rubber, thermoplastic olefins, and styrene butadiene block copolymers.

The acoustic absorbing layer 120 is formed of a sound absorbing material that exhibits good acoustic absorption characteristics (i.e., effectively absorbs acoustic energy). The material of the layer 120 exhibits superior acoustic absorption as compared to the material of the base layer 130. The material of the layer 120 may have a normal incidence sound absorption coefficient of at least 0.05 at 250 Hz and at least 0.15 at 1000 Hz as determined in accordance with The American Society of Tests and Materials (ASTM) standard test procedure E 1050, "Impedance and Absorption of Acoustical Materials Using a Tube, Two Microphones, and a Digital Frequency Analysis System". According to embodiments of the present invention, the normal incidence sound absorption coefficient does not fall below 0.70 above 5000 Hz.

Materials for the acoustic absorbing layer 120 may include open cell, polyether polyurethane foam, polypropylene, polyethylene, reticulated foams, natural, synthetic or glass fiber batt, non-woven carpet, micro-fiber layer or foamed latex. The acoustic absorbing layer 120 may be formed of a flexible urethane resin layer comprising an elastomeric flexible thermoset urethane resin, and may be a chemically blown or frothed foam layer and may have various additives. Such resin compositions may have the usual additives, and typically are composed of isocyanate materials, such as an aromatic diisocyanate, such as polyphenyl polymethylene polyisocyanate; e.g., a diphenylmethane diisocyanate present in a crude MDI-reaction mixture, reacted together with suitable polyols, such as vinyl-capped polymeric polyols like styrene-capped polymers, alone or in combination with other polyols, such as polyether polyols derived from the reaction of polyfunctional alcohols with propylene and/or with ethylene oxides. Other additives may be used, such as a catalyst like an organo-metal catalyst or amines, water-scavenging agents, such as molecular sieves, calcium sulfate and the like, plasticizers, fillers, flame retardants, pigments, blowing agents, surfactants, amines, such as tertiary amine, silicones, and other additives and modifiers typically employed in the preparation of flexible urethane thermoset solvent foam layers.

The acoustic absorbing layer 120 may comprise any thermoplastic urethane resin which is moldable; for example, above 150° F., and suitable for the purposes of preparing a moldable automobile mat. Such thermoplastic urethane resins typically comprise a long-chain polymer with minimized cross-linking. Suitable and typical urethane thermoplastic resins, based upon the employment of aliphatic. polyisocyanates, are well-known and are described, for example, in *Polyurethanes: Chemistry and Technology*, Sanders and Frisch, Interscience Publishing Co., 1914, Vol. 2, pages 379–409, herein incorporated by reference.

The acoustic absorbing layer 120 may be air permeable with an airflow resistance value of at least 200 Rayls as measured in accordance with ASTM C522-87, "Standard Test Method for Airflow Resistance of Acoustic Materials," and water-resistant. The acoustic absorbing layer 120 may be formed of a material that has portions of different densities through its thickness and/or across its width and/or length. The acoustic absorbing layer 120 may have a color different from or contrasting with a color of the layer 130. The acoustic absorbing layer 120 may include two or more layers of acoustic absorbing material. When multiple acoustic absorbing layers are utilized, each layer may have the same or different properties and dimensions. The acoustic absorbing layers may be adhered, bonded, punched, stitched or otherwise secured to one another.

According to embodiments of the present invention, the exposed acoustic absorbing layer portions 122 may constitute at least 25 percent of the total lower surface area of the mat 100. According to embodiments of the present invention, the exposed acoustic absorbing layer portions 122 may constitute between about 5 and 50 percent of the lower surface area of the mat 100.

According to embodiments of the present invention, the mat 100 may have a normal incidence sound absorption coefficient of at least 0.1 at 250 Hz and 0.1 at 1000 Hz as determined in accordance with ASTM standard test procedure E 1050. According to embodiments of the present invention, the normal incidence sound absorption coefficient of the mat 100 may not fall below 0.1 above 1000 Hz.

The mat 100 may be tunable to provide desired acoustic absorptive properties for different environments. The mat 100 may be tuned by appropriate selection of the thickness, density, cell size, fiber type, and/or other suitable characteristics of the acoustic absorbing layer 120, as well as the dimensions of the apertures 140 (and, thereby, the dimensions of the exposed portions 122). The characteristics of the face layer 110 may be varied and selected to assist in tuning the acoustics of the mat 100. The mat 100 may be incorporated into a tuned acoustic control system including other acoustic absorbing or sound deadening elements such as, for example, floor coverings, headliners, dash covers and the like.

In use, the mat 100 (as well as mat 100') may be placed in a desired location, for example, the floor of an automobile, such that the lower surfaces of the acoustic absorbing layer portions 122 and the base layer 130 face downwardly and engage the vehicle floor while the upper surface 110U of the face layer 110 faces upwardly. While the mat 100 has been described herein as a floor mat and with reference to "upper" and "lower" for convenience, it will be appreciated that the mat 100 and each of the mats described herein may be positioned or installed such that the mat is suspended from a ceiling or vertical wall so that the upper and lower orientations are reversed. However, in any event, the mats are preferably positioned or installed such that the face layer faces outwardly away from the adjacent surface (e.g., the ceiling, wall or floor) and the base layer faces toward said adjacent surface). Sounds emanating from or into the vehicle, particularly from below, can be absorbed, at least in part, by the acoustic absorbing layer 120. The integral construction of the mat 100, and in particular, the secure joinder between the layers 110, 120 and 130 can provide a durable mat 100. The mats 100, 100' may be designed such that they are reversible so that they can be disposed with the face layer 110 facing the support surface and the base layer 130 facing outwardly.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A multi-layer acoustically absorptive mat comprising:
   a base layer comprising a central portion and a peripheral portion around the central portion, and wherein a plurality of apertures are formed in the peripheral in adjacent, spaced-apart relationship;
   a face layer disposed adjacent the base layer, wherein the central portion of the base layer is directly bonded to the face layer; and
   an acoustic absorbing layer interposed between the peripheral portion of the base layer and the face layer, wherein the acoustic absorbing layer includes a respective exposed portion extending across each of the apertures.

2. The mat of claim 1, further comprising a peripheral channel between the plurality of apertures and an edge of the mat.

3. The mat of claim 1, wherein the acoustic absorbing layer is adhesively secured to the face layer.

4. The mat of claim 1, wherein the exposed portion of the acoustic absorbing layer extends outwardly from the respective apertures beyond the base layer.

5. The mat of claim 1, wherein a portion of the acoustic absorbing layer between the peripheral portion of the base layer and the face layer is compressed relative to the exposed portion of the acoustic absorbing layer.

6. The mat of claim 1, wherein the acoustic absorbing layer is formed of an acoustically absorptive material selected from the group consisting of a foamed material and a fiber material.

7. The mat of claim 6, wherein the acoustically absorptive material is selected from the group consisting of open cell, polyether polyurethane foam, polypropylene foam, reticulated foam, natural fiber batt, synthetic fiber batt, glass fiber batt, non-woven carpet, and foamed latex.

8. The mat of claim 1, wherein the acoustic absorbing layer is formed of a material that is air permeable and water-resistant.

9. The mat of claim 1, including an air permeable, water-resistant layer interposed between the acoustic absorbing layer and the face layer.

10. The mat of claim 1, wherein the base layer is formed of a moldable material selected from the group consisting of natural rubber, butadiene polymers, butadiene copolymers, isoprene polymers, isoprene copolymers, chloroprene rubbers, polyvinyl chloride, polyethylene, ethylene vinyl acetate, polypropylene, polystyrene, thermoplastic rubber, thermoplastic olefins, styrene butadiene block copolymers, and blends and copolymers thereof.

11. The mat of claim 1, wherein the face layer is formed of a decorative material selected from the group consisting of carpet, fabric and non-woven material.

12. The mat of claim 1, wherein the central portion of the base layer comprises a plurality of apertures that are configured to attenuate sound incident on the central portion of the base layer.

13. A multi-layer acoustically absorptive mat comprising:
    a base layer comprising a central portion and a peripheral portion around the central portion, and wherein a plurality of apertures are formed in the peripheral portion in adjacent, spaced-apart relationship;
    a face layer disposed adjacent the base layer; and
    an acoustic absorbing layer interposed between the peripheral portion of the base layer and the face layer, wherein the acoustic absorbing layer includes a respective exposed portion extending across each of the apertures, and wherein a portion of the acoustic absorbing layer between the peripheral portion of the base layer and the face layer is compressed relative to the exposed portion of the acoustic absorbing layer.

14. The mat of claim 13, wherein the central portion of the base layer is directly bonded to the face layer.

15. The mat of claim 13, further comprising a peripheral channel between the plurality of apertures and an edge of the mat.

16. The mat of claim 13, wherein the acoustic absorbing layer is adhesively secured to the face layer.

17. The mat of claim 13, wherein the exposed portion of the acoustic absorbing layer extends outwardly from the respective apertures beyond the base layer.

18. The mat of claim 13, wherein the acoustic absorbing layer is formed of an acoustically absorptive material selected from the group consisting of a foamed material and a fiber material.

19. The mat of claim 18, wherein the acoustically absorptive material is selected from the group consisting of open cell, polyether polyurethane foam, polypropylene foam, reticulated foam, natural fiber batt, synthetic fiber batt, glass fiber batt, non-woven carpet, and foamed latex.

20. The mat of claim 13, wherein the acoustic absorbing layer is formed of a material that is air permeable and water-resistant.

21. The mat of claim 13, including an air permeable, water-resistant layer interposed between the acoustic absorbing layer and the face layer.

22. The mat of claim 13, wherein the base layer is formed of a moldable material selected from the group consisting of natural rubber, butadiene polymers, butadiene copolymers, isoprene polymers, isoprene copolymers, chloroprene rubbers, polyvinyl chloride, polyethylene, ethylene vinyl acetate, polypropylene, polystyrene, thermoplastic rubber, thermoplastic olefins, styrene butadiene block copolymers, and blends and copolymers thereof.

23. The mat of claim 13, wherein the face layer is formed of a decorative material selected from the group consisting of carpet, fabric and non-woven material.

24. The mat of claim 13, wherein the central portion of the base layer comprises a plurality of apertures that are configured to attenuate sound incident on the central portion of the base layer.

25. A multi-layer acoustically absorptive mat comprising:
- a base layer comprising a central portion and a peripheral portion around the central portion, and wherein a plurality of apertures are formed in the peripheral portion in adjacent, spaced-apart relationship;
- a face layer disposed adjacent the base layer;
- an acoustic absorbing layer interposed between the peripheral portion of the base layer and the face layer, wherein the acoustic absorbing layer includes a respective exposed portion extending across each of the apertures; and
- an air permeable, water-resistant layer interposed between the acoustic absorbing layer and the face layer.

26. The mat of claim 25, wherein the central portion of the base layer is directly bonded to the face layer.

27. The mat of claim 25, further comprising a peripheral channel between the plurality of apertures and an edge of the mat.

28. The mat of claim 25, wherein the acoustic absorbing layer is adhesively secured to the face layer.

29. The mat of claim 25, wherein the exposed portion of the acoustic absorbing layer extends outwardly from the respective apertures beyond the base layer.

30. The mat of claim 25, wherein a portion of the acoustic absorbing layer between the peripheral portion of the base layer and the face layer is compressed relative to the exposed portion of the acoustic absorbing layer.

31. The mat of claim 25, wherein the acoustic absorbing layer is formed of an acoustically absorptive material selected from the group consisting of a foamed material and a fiber material.

32. The mat of claim 31, wherein the acoustically absorptive material is selected from the group consisting of open cell, polyether polyurethane foam, polypropylene foam, reticulated foam, natural fiber batt, synthetic fiber batt, glass fiber batt, non-woven carpet, and foamed latex.

33. The mat of claim 25, wherein the acoustic absorbing layer is formed of a material that is air permeable and water-resistant.

34. The mat of claim 25, wherein the base layer is formed of a moldable material selected from the group consisting of natural rubber, butadiene polymers, butadiene copolymers, isoprene polymers, isoprene copolymers, chloroprene rubbers, polyvinyl chloride, polyethylene, ethylene vinyl acetate, polypropylene, polystyrene, thermoplastic rubber, thermoplastic olefins, styrene butadiene block copolymers, and blends and copolymers thereof.

35. The mat of claim 25, wherein the face layer is formed of a decorative material selected from the group consisting of carpet, fabric and non-woven material.

36. The mat of claim 25, wherein the central portion of the base layer comprises a plurality of apertures that are configured to attenuate sound incident on the central portion of the base layer.

* * * * *